May 21, 1940.    A. R. COE    2,201,676
CLUTCH
Filed Nov. 10, 1937
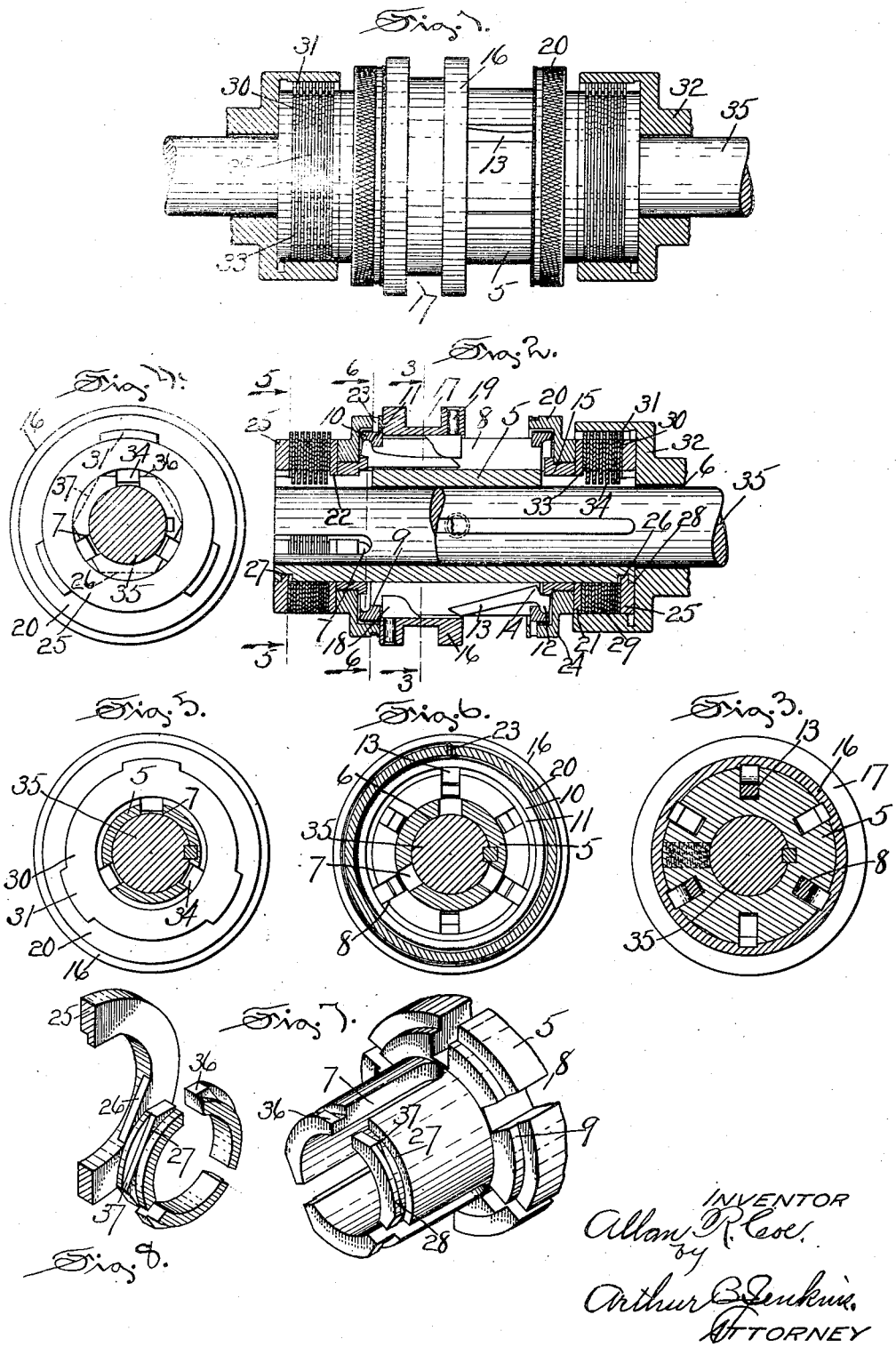
INVENTOR
Allan R. Coe
by
Arthur B. Jenkins
ATTORNEY Patented May 21, 1940

2,201,676

UNITED STATES PATENT OFFICE 2,201,676

CLUTCH

Allan R. Coe, Manchester, Conn., assignor to The Carlyle Johnson Machine Co., Manchester, Conn., a corporation of Ohio Application November 10, 1937, Serial No. 173,880

9 Claims. (Cl. 192—69)

My invention relates to the class of devices that are employed for establishing a driving connection between mechanism, and an object of my invention, among others, is the production of a device of this type that shall be simple in construction and particularly efficient in operation.

One form of a device embodying my invention and in the construction and use of which the objects herein set out, as well as others, may be attained is illustrated in the accompanying drawing in which Figure 1 is a side view of a clutch embodying my invention.

Figure 2 is a view in central lengthwise section through the same.

Figure 3 is a view in cross section on a plane denoted by the dotted line 3—3 of Fig. 2.

Figure 4 is an end view.

Figure 5 is a view in section on a plane denoted by the dotted line 5—5 of Fig. 2.

Figure 6 is a view in section on a plane denoted by the dotted line 6—6 of Fig. 2.

Figure 7 is an isometric, perspective view of one end of the clutch body.

Figure 8 is a detail isometric perspective view of the locking ring shown in position to be attached to the end of the clutch body, the latter being cut off.

My improved clutch is illustrated and described herein as a double clutch, that is, clutch mechanism is located at opposite ends of the body, but it will be obvious that such mechanism may be embodied in a single clutch located at one end of the body only. Therefore the description herein will be confined to the members located at one end of the body only, it being understood that the members at the opposite end of the body will be of duplicate construction and arrangement. In the accompanying drawing the numeral 5 denotes the body of my improved clutch that is preferably round in cross section with a central opening 6 therethrough and having slots 7 extending inwardly from one end, this end being reduced in size from the main part of the body. Grooves 8 extend lengthwise in the main part of the body which has a shoulder 9 formed at the end of said main part. In the preferred form of the structure and as shown herein there are three of the slots 7 and three grooves 8, although this number may be departed from if desired. A seating ring 10 is firmly secured upon the shoulder 9 and has an annular groove 11 in which the heels 12 of clutch levers 13 are seated. Each of said levers has a toe 14 adapted to thrust against a clutch ring 15 slidably mounted on the reduced portion of the body.

A clutch sleeve 16 is slidably mounted on the body, said sleeve having an annular groove 17 to receive pins from a pivotally mounted actuating lever (not shown) but the operation of which will be readily understood by those skilled in the art. Actuating cams 18 projecting from the inner surface of the sleeve 16 into the grooves 8 are positioned to engage the ends of the clutch levers 13 to rock them on the fulcrums provided by the heels 12. In the preferred form, and as shown herein, these cams are formed on the ends of pins 19 secured in holes in the sleeve 16, and as shown in Fig. 2 of the drawing. A pressure adjusting ring 20 is screw threadedly engaged with the clutch ring 15 and in contact with a pressure plate 21 in the form of a ring slidable upon the reduced portion of the body and having a lug 22 engaged in one of the slots 7 to retain it from rotation. Said adjusting ring has a spring pressed detent 23 located in a flange 24 in said ring, the inner end of the detent being engaged with the ribbed and grooved edge of said ring 10, whereby said adjusting ring is held in any position of adjustment.

It is of material advantage, particularly in the construction of a double ended clutch, as shown herein, that the ends of the clutch body be reduced in size over that of the lengthwise central part of said body, and it is therefore essential that means shall be provided for placing the different parts in position from that end of the body on which said parts are located and for removably but securely retaining said parts in place. To this end I have provided a simple and very effective removable retaining member that may be readily placed in position and as readily removed, but that will at the same time be securely locked in retaining position. To effect my purpose the end of the clutch body 5 is provided with a flat or flats 36, three being shown herein, which cut into an annular groove 27, and said groove is provided on its outer side, that is, that side toward the end of the clutch body, with locking shoulders 37. A retaining ring 25 is shaped to fit the end of the body, said ring having a circularly shaped opening to fit the round portion of the end of said body and also having locking webs 26 which cut into the circular form of the opening and fit over the flats 36. The locking shoulders 37 in the outer side of the groove 27 are of corresponding shape to the flats 36, being spaced the same distance apart as are said flats, and the same is true of the locking webs 26.

In operation the different members of the clutch, including the clutch disks now to be described, are assembled upon the clutch body and the retaining ring 25 being positioned with the webs 26 located opposite the flats 36 said ring is assembled with said body by sliding it on to the end thereof until said webs are located opposite the groove 27. Said ring being now given a partial turn it is engaged with the body by passage of the webs along said groove until they reach a point opposite the locking shoulders 37. In this position pressure of the clutch disks will effect locking movement of the retaining ring by movement of the webs on to said shoulders when pressure against the opposite side of the ring is released, and the ring will consequently be locked securely in place against turning movement. To remove the ring it is pressed inwardly against the pressure of the clutch disks thereby disengaging the webs from the locking shoulders and the ring is then turned until said webs arrive opposite the flats 36 when pressure of the clutch disks will force the ring off of the end of the clutch body.

Clutch disks 29 of any suitable number are located between the retaining ring 25 and pressure plate 21, these disks consisting of two sets, the disks 30 of one set having lugs 31 engaged within a groove or grooves in a connected member 32 which may be of any suitable construction such as required herein. The disks 33 of another set have lugs 34 engaged within the slots 7 in the reduced end of the body.

In the operation of the device the clutch sleeve 16 being forced into the position shown in Fig. 2, as by means of an operating lever, not shown, but which will be readily understood, the cams 18 are engaged with the clutch levers 13 the outer ends of which are swung inwardly rocking on the fulcrums provided by the annular groove 11, the toes 14 of the levers being thus pressed against the clutch ring 15 carrying the adjusting ring 20. This operation presses the adjusting ring against the pressure plate 21 and forces the members of the two sets of disk clutches tightly into engagement, thereby connecting the body 5 with the connected member 32 so that the two are caused to rotate together.

As hereinbefore intimated the structure of the body together with the mechanism mounted thereon are duplicated at opposite ends of said body from which it will be seen that a single clutch mechanism may be employed or a double clutch mechanism as may be desired. The clutch body is secured to a shaft 35 that may serve as the driving member or the driven member, usually the former.

Should in any case the clutch disks not afford sufficient spring action to permit the webs 26 on the locking ring 25 to enter the groove 27, the adjusting ring 20 may be screwed backwardly from the end of the clutch body to provide the required space, and after the ring 25 has been placed in its locking position, the adjusting ring 20 may be placed in its former position.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A clutch including a body, a seating ring secured to said body and having a roughened edge, a set of clutch levers each having one part seated against said ring, a clutch ring movably mounted on said body in engagement with another part of each of said levers, a pressure adjusting ring secured to said clutch ring, a detent on said pressure ring spring pressed into engagement with said roughened edge on said seating ring for holding the adjusting ring in positions of adjustment, a set of clutch disks mounted on said body and operatively connected with said clutch ring, and means for rocking said clutch levers on their fulcrums.

2. A clutch including a body, clutch disks mounted upon one end of said body and consisting of a plurality of sets, one of which sets is secured to rotate with the clutch body and the other of said sets being adapted for engagement with a member for connection of the latter with said body, a retaining member movable on to the end of the body with said disks in place thereon, means comprising permanent parts of said member and body to permit engagement of said member with said body and to lock said member against both endwise and rotary movement on the body, and means for pressing said disks together to operatively connect said body and member.

3. A clutch including a body having its end reduced in diameter, clutch disks assembled on said body over said smaller end, said disks consisting of a plurality of sets, one of said sets being secured to rotate with the clutch body and the other of said sets being adapted for engagement with a member for connection of the latter with said body, a retaining member on to this reduced end of the body with said disks in place thereon, means comprising permanent parts of said member and body to permit engagement of said member with said body and to lock said member against both endwise and rotary movement on the body, and means for pressing said disks together to operatively connect said body and member.

4. A clutch including a body, clutch disks mounted upon the end of said body and consisting of a plurality of sets, one of which sets is secured to rotate with the clutch body and the other of said sets being adapted for engagement with a member for connection of the latter with the body, a retaining member removably attached to the end of said body to hold said clutch disks in place, interengaging means permanent with said retaining member and body to permit movement of said retaining member longitudinally of the body in one direction, then rotatably on the body and then longitudinally in the opposite direction to secure it in place.

5. A clutch including a body, clutch disks mounted upon the end of said body and consisting of a plurality of sets, one of which sets is secured to rotate with the clutch body and the other of said sets being adapted for engagement with a member for connection of the latter with the body, a retaining member removably attached to the end of said body to hold said clutch disks in place, cooperating flats upon said body and retaining member to permit movement of said member longitudinally of the body in one direction, then rotatably of the body and then movement longitudinally in the opposite direction to secure said member in place, and means for limiting the last mentioned longitudinal movement of said retaining member.

6. A clutch including a body, clutch disks mounted upon the end of said body and consisting of a plurality of sets, one of which sets is secured to rotate with the clutch body and the other of said sets being adapted for engagement with a member for connection of the latter with the body, a retaining member removably attached to the end of said body to hold said clutch disks in place, said member having a retaining lip with a straight edge and said body having an annular groove and flats to cooperate with said lip to permit longitudinal movement in opposite directions of said member and also rotary movement with the lip in said groove for attachment of said member to the body and for removal therefrom.

7. A clutch including a body having an annular groove, clutch disks mounted upon the end of said body and consisting of a plurality of sets, one of which sets is secured to rotate with the clutch body and the other of said sets being adapted for engagement with a member for connection of the latter with the body, a retaining member removably attached to the end of said body to hold said clutch disks in place, cooperating flats upon said body and retaining member to permit movement of said retaining member longitudinally of the body in opposite directions for assembly and locking engagement and also rotatably of the body preliminary to said locking engagement, and means for limiting the last mentioned longitudinal movement of said retaining member.

8. A clutch including a body having an annular groove with a locking shoulder therein, clutch disks mounted upon the end of said body and consisting of a plurality of sets, one of which sets is secured to rotate with the clutch body and the other of said sets being adapted for engagement with a member for connection of the latter with the body, a retaining member removably attached to the end of said body to hold said clutch disks in place, a locking lip having a straight edge upon said retaining member, and a flat upon said body cooperating with said straight edge to permit movement of the retaining member longitudinally of the body for entry of said lip into said annular groove and for engagement of said lip with said shoulder to lock said retainer from rotary movement.

9. A clutch including a body having an annular groove with a locking shoulder therein, clutch disks mounted upon the end of said body and consisting of a plurality of sets, one of which sets is secured to rotate with the clutch body and the other of said sets being adapted for engagement with a member for connection of the latter with the body, and a retaining member removably attached to the end of said body to hold said clutch disks in place, said body and retaining member having cooperating means to permit assembly of the retaining member longitudinally of the body in one direction, then rotary engagement of the retainer on said body and then longitudinal locking movement in the opposite direction to prevent rotary movement of said retainer to lock it in position.

ALLAN R. COE.